Aug. 7, 1934.  C. L. BEAL  1,969,252
MANUFACTURE OF HOLLOW RUBBER ARTICLES
Filed Dec. 29, 1932
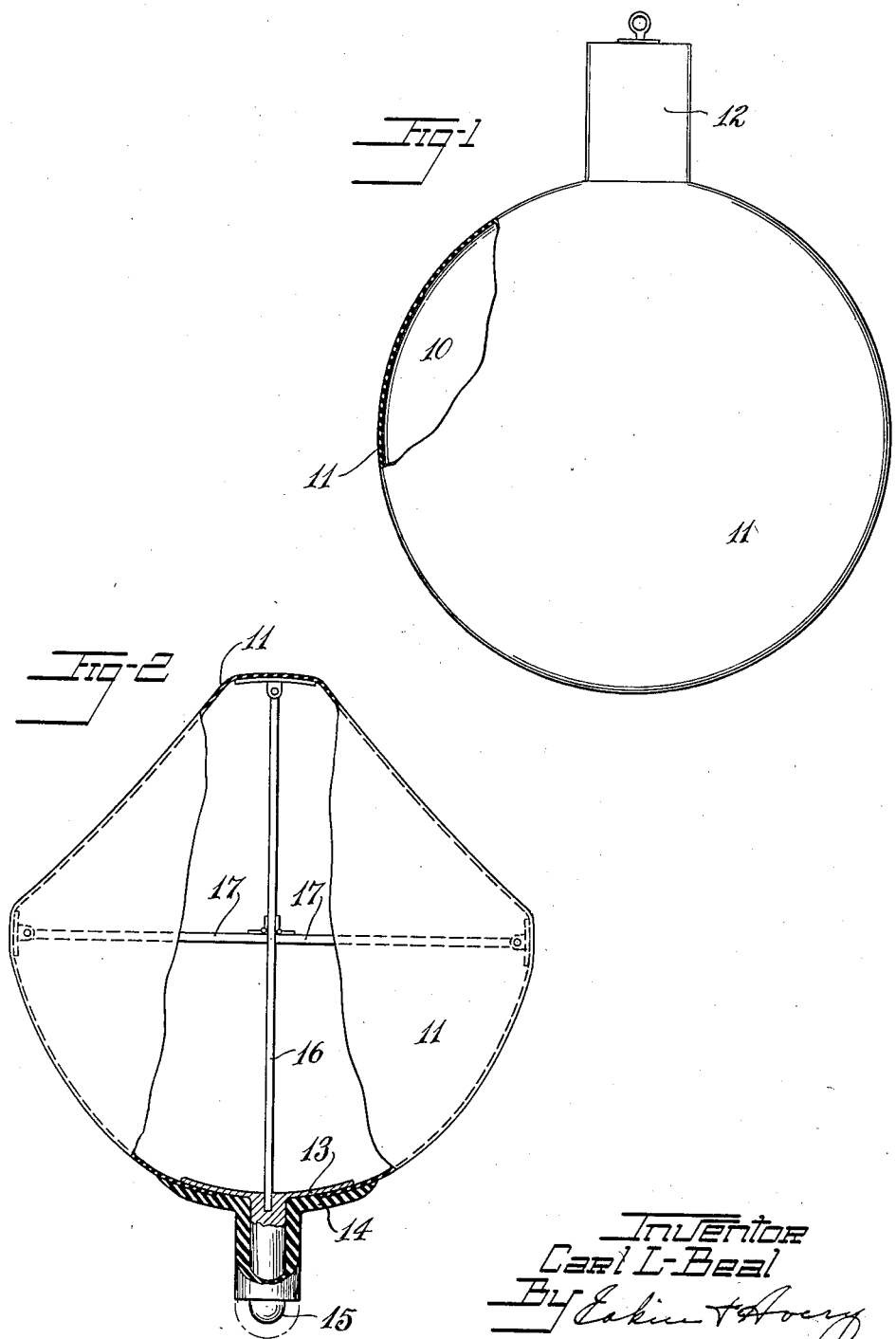

Patented Aug. 7, 1934

1,969,252

UNITED STATES PATENT OFFICE 1,969,252

MANUFACTURE OF HOLLOW RUBBER ARTICLES

Carl L. Beal, Cuyahoga Falls, Ohio, assignor to American Anode, Inc., Akron, Ohio, a corporation of Delaware Application December 29, 1932, Serial No. 649,333

11 Claims. (Cl. 18—41)

This invention relates to the manufacture from rubber dispersions of hollow rubber articles, particularly articles such as large balloons having a relatively small opening and a section sufficiently larger than such opening to render impossible stripping of the article from a form having the shape of the finished article.

Hollow rubber articles of various types and designs are now commonly made by immersing a shaped form in a rubber dispersion, depositing upon the form a coating of rubber, drying and vulcanizing the rubber, and stripping the article from the form. The deposition of rubber from the dispersion may be effected in any one of a number of well known manners including the use of porous forms through which the liquid vehicle of the dispersion may filter to leave the suspended solids deposited upon the form, the use of forms embodying a chemical coagulant adapted to diffuse into the dispersion and coagulate a coherent rubber deposit upon the form, the use of electrophoretic means for effecting the deposition, or simply by dipping a form into the dispersion a sufficient number of times, either with or without intermediate coagulant treatments, to acquire a rubber deposit of a desired thickness.

In stripping hollow rubber articles it is frequently necessary to stretch a relatively small rubber neck or opening over a larger section of the deposition form. The ultimate elongation of a high grade vulcanized rubber composition prepared for example from a compounded natural Hevea brasiliensis latex is about 900%, but since it is undesirable to stretch a rubber article during stripping to an extent approaching the ultimate elongation, the forms upon which articles are made have been designed to permit stripping the articles without stretching them to an extent greater than about 600%. As a practical matter a "stripping ratio" (the ratio of the width or diameter of the largest section of the article to the width or diameter of its neck or opening, or the ratio of the corresponding dimensions of the deposition form) of about 5 to 1 has been generally adopted. Consequently, it has not been feasible to manufacture in the manner described articles having in their normal condition sections greater than about five times the size of the opening through which the deposition form must be removed.

It is often necessary however to manufacture hollow rubber articles having a "stripping ratio" much greater than the allowable, and the chief object of this invention accordingly is to provide a simple method of manufacturing such articles directly from rubber dispersions without subjecting the articles to undue strains during the stripping operation.

Broadly, the present invention comprises producing upon a principal form a rubber deposit having a "stripping ratio" within the allowable range, but constituting a portion only of the final article, stripping this portion from the principal form and associating with it an auxiliary form adapted to form the remaining portion of the article and likewise having a "stripping ratio" sufficiently small to permit ready removal of the auxiliary form from the finished article, and then producing upon the auxiliary form a second deposit of rubber constituting the remainder of the article adhered to and integral with the first deposit. Thereafter the rubber is dried, vulcanized if desired, and the auxiliary form is removed from the finished article.

By way of example the invention will be described in connection with the manufacture of a large rubber balloon, though it is by no means limited to such use but may be employed with equal facility in the manufacture of numerous hollow rubber articles of various shapes and designs.

In the accompanying drawing, Fig. 1 is an elevation of a principal form suitable for use in the present invention with a rubber deposit constituting a portion of a balloon thereon, the rubber deposit being partially broken away.

Fig. 2 is an elevation of the finished balloon associated with the auxiliary form, the rubber of the balloon being broken away in places to show the auxiliary form more clearly, and the auxiliary form being shown partially in section.

A principal form 10 of metal porcelain, bakelite or similar material having the shape of a major portion of the article to be made is coated with a layer of rubber 11 preferably by coating the form with a coagulant and immersing the coagulant-coated form in a rubber dispersion to acquire a rubber deposit, although any of the methods hereinabove indicated may be employed. In the present example the form may be a substantially flat circular disc having a neck 12 adapted to form an opening in the rubber deposit which will be large enough with respect to the greatest dimension of the principal form to allow its ready removal from the deposit. The form preferably is immersed in the dispersion only as far as the base of its neck portion in order that the principal rubber deposit may have substantially no neck but simply an opening in the deposit. However, if a neck portion should be formed, the undesirable portion thereof may be trimmed away to prepare an opening of the desired configuration. Likewise, a deposit may be formed having an opening much smaller than is required, or even with no opening at all, and such portions of the deposit then cut away as may be necessary to allow stripping. Thereafter, the principal deposit 11 constituting a substantial, but incomplete portion of the balloon, is dried and stripped from the principal form.

Next, an auxiliary form 13 having a "stripping ratio" within the allowable range and shaped to form the remaining incomplete portion of the balloon is placed within the principal deposit, with the margins of the form resting upon and being supported by the margins of the opening in the principal deposit. Then a second rubber deposit 14 is applied over the auxiliary form and contiguous portions of the principal deposit to form an integral, essentially one-piece rubber deposit which is dried and vulcanized in the customary manner.

The second rubber deposit, like the first or principal deposit, is preferably although not necessarily formed by coating the auxiliary form with a coagulant and immersing the coagulant-coated form into a coagulable rubber dispersion. The coagulant may be wiped off the tip 15 of the auxiliary form so that no deposit will be formed thereon, or, if such a deposit is formed, that portion of the rubber covering the tip of the form may be cut off to provide an inflating opening in the balloon through which the auxiliary form may be readily removed.

In the particular case of manufacturing balloons, the second or auxiliary rubber deposit will usually be made somewhat heavier than the principal deposit to provide a heavier inflating tube with a surrounding reenforced area.

In commercial manufacture, it is sometimes found that before the second rubber deposit can be applied, the first or principal deposit has dried to a condition which prevents securing the best possible adhesion between the two deposits. In such cases, the margins of the first deposit may be coated, before application of the second deposit, with a suitable rubber adhesive such as rubber cement, or compounded or uncompounded latex. Particularly good adhesion is obtained if the margins of the first deposit are coated with a thin film of latex, the latex dried to a tacky condition, and then coated with a rubber coagulant adapted to coagulate the second deposit thereover upon the subsequent application of a coagulable rubber dispersion.

In many cases, it will be found convenient to provide a supporting member 16 removably associated with the auxiliary form and adapted to extend into the interior of and to support the principal rubber deposit in a near normal position during the deposition of the second deposit. Likewise, horizontal members 17 hinged or removably secured to the vertical member and adapted to extend outwardly and support the sides of the deposit may also be found useful in some cases in helping to maintain the principal deposit in a desired position with respect to the auxiliary form. Obviously such supporting members must be capable of being folded or disassembled to permit their insertion into and removal from the interior of the deposit.

The liquid rubber dispersions employed in manufacturing articles according to the present invention may be any flowable dispersion of rubber or analogous gum, either with or without compounding ingredients, dispersed in a liquid vehicle, which may be either a solvent or a non-solvent of rubber. Typical examples of such dispersions are respectively the so-called rubber cements and natural and artificial aqueous dispersions of rubber.

It is obvious that numerous changes and modifications may be made in the method and apparatus as hereinabove described without departing from the spirit of the invention as defined in the appended claims.

I claim:

1. In the manufacture of a hollow rubber article having an opening and an enlarged section which prevents ready stripping of the article from a form having the shape of the finished article, the method which comprises depositing upon a principal form rubber constituting a substantial portion of the article capable of being stripped from said principal form, stripping the deposit, providing an auxiliary form adapted to form the remaining portion of the article and capable of being removed from the finished article, depositing upon the auxiliary form a second deposit of rubber constituting the remaining portion of the article adhered to the first deposit, and removing the auxiliary form from the article.

2. In the manufacture of a hollow rubber article having an opening and a section larger than the opening which prevents ready stripping of the article from a form having the shape of the finished article, the method which comprises applying a coating of a rubber dispersion to a principal form to produce a rubber deposit constituting a substantial portion of the article capable of being stripped from said principal form, stripping the deposit, providing an auxiliary form adapted to form the remaining portion of the article and capable of being removed from the finished article, applying a coating of a rubber dispersion to the auxiliary form to produce a second deposit of rubber constituting the remaining portion of the article adhered to the first deposit, and removing the auxiliary form from the article.

3. In the manufacture of a hollow rubber article having an opening and a section larger than the opening which prevents ready stripping of the article from a form having the shape of the finished article, the method which comprises depositing upon a principal form rubber constituting a substantial portion of the article capable of being stripped from said principal form, stripping the deposit, providing an auxiliary form shaped and positioned to form the remaining portion of the article and capable of being removed from the finished article, coating the margins of the incomplete portion of the rubber deposit with a rubber adhesive, depositing upon the auxiliary form and over the adhesive-coated portions of the first deposit a second deposit of rubber constituting the remaining portion of the article adhered to the first deposit, and removing the auxiliary form from the article.

4. In the manufacture of a hollow rubber article having an opening and a section larger than the opening which prevents ready stripping of the article from a form having the shape of the finished article, the method which comprises depositing upon a principal form rubber constituting a substantial portion of the article capable of being stripped from said principal form, stripping the deposit, providing an auxiliary form shaped and positioned to form the remaining portion of the article and capable of being removed from the finished article, coating the margins of the incomplete portion of the rubber deposit with a rubber adhesive, coating the auxiliary form and the adhesive-coated portions of the adjacent rubber deposit with a coagulant, immersing the coagulant coated auxiliary form and portions of the rubber deposit in a coagulable rubber dispersion to produce a second rubber deposit constituting the remaining portion of the article adhered to and integral with the first deposit, and removing the auxiliary form from the article.

5. In the manufacture of a hollow rubber article having an opening and a section larger than the opening which prevents ready stripping of the article from a form having the shape of the finished article, the method which comprises immersing in a coagulable rubber dispersion a coagulant-coated principal form to produce thereon a rubber deposit constituting a substantial portion of the article capable of being stripped from said principal form, stripping the deposit, providing an auxiliary form adapted to form the remaining portion of the article and capable of being removed from the finished article, depositing upon the auxiliary form a second deposit of rubber constituting the remaining portion of the article adhered to the first deposit, and removing the auxiliary form from the article.

6. In the manufacture of a hollow rubber article having an opening and a section larger than the opening which prevents ready stripping of the article from a form having the shape of the finished article, the method which comprises depositing upon a principal form rubber constituting a substantial portion of the article capable of being stripped from said principal form, stripping the deposit, providing an auxiliary form adapted to form the remaining portion of the article and capable of being removed from the finished article, coating the auxiliary form with a coagulant, immersing the coagulant-coated auxiliary form in a coagulable rubber dispersion to produce thereon a second deposit of rubber constituting the remaining portion of the article adhered to the first deposit, and removing the auxiliary form from the article.

7. In the manufacture of a hollow rubber article having an opening and a section larger than the opening which prevents ready stripping of the article from a form having the shape of the finished article, the method which comprises immersing in a coagulable rubber dispersion a coagulant-coated principal form to produce a rubber deposit constituting a substantial portion of the article capable of being stripped from said principal form, stripping the deposit, providing an auxiliary form adapted to form the remaining portion of the article and capable of being removed from the finished article, coating the auxiliary form and a portion of the adjacent rubber deposit with a coagulant, immersing the coagulant coated auxiliary form and portions of the rubber deposit in a coagulable rubber dispersion to produce a second rubber deposit constituting the remaining portion of the article adhered to and integral with the first deposit, and removing the auxiliary form from the article.

8. In the manufacture of a hollow rubber article having an opening and a section larger than the opening which prevents ready stripping of the article from a form having the shape of the finished article, the method which comprises depositing upon a principal form rubber constituting a substantial portion of the article having an opening sufficiently large to permit stripping the deposit from said principal form, stripping the deposit, inserting therein an auxiliary form adapted to form the remaining portion of the article and having a projecting member adapted to support the first deposit in approximately its normal position while a second deposit constituting the remaining portion of the article is being deposited upon the auxiliary form continuous with the first deposit, said auxiliary form being capable of removal from the finished article, then depositing upon the auxiliary form and contiguous portions of the first deposit, a second deposit of rubber constituting the remainder of the article adhered to the first deposit, and removing the auxiliary form from the article.

9. Apparatus for supporting a hollow rubber article having an opening from within the article by contact with the walls thereof and for simultaneously providing a form for building an apertured integral closure in the opening, said apparatus comprising a form having an aperture-defining stem with substantially rigid means carried by the stem and extending outward therefrom to be associated with the inner walls of the article about the opening therein for supporting the form in determinate relation with said walls while building upon said form an apertured closure for the opening, and demountable means carried by the form extending in a direction generally opposed to that of said stem for contacting with the inner walls of the article to support the article in a position to permit building an integral closure for the opening therein, the dimensions of said form and of said demountable means being such as will permit of their separate withdrawal through the aperture in a rubber closure built upon the form.

10. Apparatus as defined by claim 9 in which the demountable means comprises a relatively long rigid member extending in a direction generally opposed to that of the stem, and a similar member loosely mounted thereon and extending outward therefrom.

11. Apparatus as defined by claim 9 in which the demountable means comprises a relatively long rigid member extending in a direction generally opposed to that of the stem, and a similar member hinged thereto and adapted to extend outward therefrom.

CARL L. BEAL.